United States Patent
Rosen et al.

[15] 3,692,794
[45] Sept. 19, 1972

[54] 1,2,4-THIADIAZOLES

[72] Inventors: Melvin Harris Rosen, Florham Park, N.J. 07932; Herbert Morton Blatter, Summit, N.J. 07901

[73] Assignee: Ciba-Geigy Corporation

[22] Filed: Sept. 3, 1970

[21] Appl. No.: 69,469

[52] U.S. Cl. ..........................260/302 SD, 424/270
[51] Int. Cl. ...............................................C07d 91/60
[58] Field of Search..............................260/302 SD

[56] References Cited

OTHER PUBLICATIONS

Noguchi et al., Chem. Abstracts, 70:77873q (1969).

Primary Examiner—Alex Mazel
Assistant Examiner—R. J. Gallagher
Attorney—Harry Goldsmith, Joseph G. Kolodny and Mario A. Monaco

[57] ABSTRACT

New 5-sulfinyl- or sulfonyl-1,2,4-thiadiazoles, e.g. those of the formula

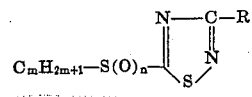

R = H or an aliphatic or araliphatic radical
$n = 1$ or 2
$m = 1-7$ and salts thereof are antifungal agents.

6 Claims, No Drawings

1,2,4-THIADIAZOLES

SUMMARY OF THE INVENTION

The present invention concerns and has for its object the provision of new aliphatically substituted 5-sulfinyl- or sulfonyl-1,2,4-thiadiazoles, particularly those having Formula I

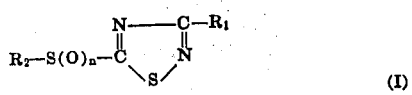

in which $R_1$ is hydrogen or an aliphatic or araliphatic radical, $R_2$ is an aliphatic hydrocarbon radical, and $n$ is the integer 1 or 2, or salts thereof, and methods for the preparation of said compounds; as well as corresponding pharmaceutical compositions, their preparation and use. The compounds of the invention possess antifungal activity and are useful for this purpose.

DESCRIPTION OF THE PREFERRED EMBODIMENTS

An aliphatic radical $R_1$ and $R_2$ is, for example, a hydrocarbon radical, such as lower alkyl, e.g., methyl, ethyl n- or i-propyl, -butyl, -pentyl, -hexyl or -heptyl. The term "lower," referred to above and hereinafter in connection with organic radicals or compounds respectively, defines such with up to seven, preferably up to four, carbon atoms. Said aliphatic radical, $R_1$, especially the lower alkyl group, is unsubstituted or substituted, preferably by one to three halo atoms, e.g., flouro, chloro or bromo, or phenyl groups.

The compounds of the invention exhibit valuable pharmacological properties. For example, they show anti-dermatophyte activity, as can be demonstrated in in vitro or in in vivo tests, using for the latter advantageously mammals, such as guinea pigs as test animals. The former tests can be performed according to the gradient plate method with fungi selected, for example, from Trichophyton, Microsporum or the pathogenic yeast strains, e.g., T. mentagrophytes, T. rubrum or T. simiae; M. canis or M. gypseum; or C. albicans, C. parasilo, C. krusei, Histoplasma capsulatum or Cryptococcus neoformans. The anti-dermatophyte activity can also be observed in vivo, e.g., according to Molinus, J. Investig. Dermatol; 25, 33 (1955), where guinea pigs are infected on the shaven back with a homogeneous agar suspension of a 10 day old culture of T. mentagrophytes grown on Sabouraud's agar. Treatment with about 0.1–2 percent medicated solutions or ointments is started after 24 hours and continued once daily for 10 days. During this time, portions of hair and skin scales are taken from 5 different sites of the infected area and subcultured on Mycosel agar plates, which are incubated and examined for growth. Thus, for example, 3-n-butyl-5-ethylsulfonyl-1,2,4-thiadiazole, a characteristic compound of the present invention, showed outstanding activity in vitro against the above-mentioned fungi, and also, when administered as medicated solutions or ointments in the above concentration, especially at about 2 percent, produced a complete sterilization of the infected sites on the backs of guinea pigs, as judged by the inability to isolate the infecting organism from the site of infection. Accordingly, the compounds of the invention are useful as parenterally applicable antifungal agents, as well as useful intermediates in the preparation of other valuable products, preferably of pharmacologically active compounds.

Particularly useful are compounds of the Formula I in which $R_1$ is hydrogen, lower alkyl, mono-, di- or tri-halo-lower alkyl or mono-, di- or tri-phenyl-lower alkyl, $R_2$ is lower alkyl and $n$ is 2.

Especially valuable are compounds of the Formula I in which each of $R_1$ and $R_2$ is lower alkyl, especially methyl, ethyl, n- or i-propyl or -butyl.

The compounds of in a invention are prepared according to methods in themselves known. For example, the process for their preparation consists in converting a compound of formula II

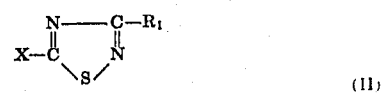

in which X is a group capable of being converted into the $R_2-S(O)_n-$ group, X into said group and, if desired, converting any resulting compound into another compound of the invention.

A suitable group X is, for example, the mercapto group $R_2S-$, which is converted into the sulfinyl or sulfonyl group $R_2S(O)_n-$ by oxidation. Such oxidation is carried out in the manner known per se, advantageously with the use of inorganic or organic oxidation agents, such as halogens or their oxidizing salts, e.g., moist chlorine or sodium periodate, heavy metal oxides or salts, e.g., chromium trioxide or potassium permanganate, preferably peroxides, such as hydrogen peroxide or percarboxylic acids, e.g., perbenzoic, m-chloroperbenzoic or mono-perphthalic acid. The formation of sulfoxides or sulfones can be controlled by the application of equivalent amounts of the oxidation agent and/or the reaction conditions, e.g., temperature or concentration.

Another group X is, for example, a reactively converted sulfino or sulfo group, such as a halosulfinyl or -sulfonyl, e.g., chlorosulfinyl or -sulfonyl group. The corresponding starting material can be reacted with an $R_2$-metal compound, such as a lithium, zinc or advantageously halomagnesium compound, to form the desired compounds of Formula I.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, alcohols, acids, ammonia, primary or secondary amines may be used in the form of their alkali metal salts or basic reactants in the form of their acid addition salts. Mainly, those starting materials should be used in the reactions of the invention that lead to the formation of those compounds indicated above as being specially valuable.

The starting material used is known or, if new, may be prepared analogous to the methods used for the known compounds For example, the 5-mercapto compounds can be prepared by condensation of 5-halo-3-$R_1$-1,2,4-thiadiazoles with $R_2$-mercaptans in the presence of a strong base, such as an alkali metal hydroxide or alkoxide, e.g., sodium or potassium hydroxide, methoxide, i-propoxide, tert-butoxide, or especially sodium ethoxide. The 5-halo-3-$R_1$-1,2,4-thiadiazoles can be prepared, in turn, according to the methods described in Chem. Ber., 90, 182 (1957) and in Adv. in Heterocycl. Chem., 5, 119 (1965). The reactively converted 5-sulfinic or sulfonic acids can be obtained from corresponding 5-mercapto- or 5-benzylmercapto compounds, hydrogen peroxide and a halogen, e.g., chlorine.

The pharmacologically active compounds of the invention are useful in the manufacture of pharmaceutical compositions containing an effective amount thereof in conjunction or admixture with excipients suitable especially for topical use. These compositions contain a pharmacologically effective amount, for example from about 0.1 percent to about 10 percent, especially from about 0.5 percent to about 5 percent, of the compounds of the invention together with a pharmaceutical excipient. A composition for topical use is advantageously an emulsion preparation, e.g., a cream, ointment or lotion which, apart from the active ingredient, contains the usual carrier substances for such preparations, e.g., water, benzyl alcohol, cetyl alcohol, propylene glycol, polyethylene glycol, polysorbate, stearic acid, sodium lauryl sulfate, glyceryl monostearate, isopropyl myristate sorbitan sesquioleate, lanolin, white petrolatum, liquid petrolatum, spermaceti or any other suitable carrier material, and, if necessary, auxiliary substances, such as activating agents, e.g., N,N-di-lower alkyl-formamides, for example, N,N-dimethylformamide, preserving agents, e.g., phenyl mercuric acetate, as well as stabilizing, wetting, emulsifying and/or coloring agents. The compositions, which may contain other pharmacologically active ingredients, particularly other antimicrobial agents, are prepared according to the standard methods employed in the art.

The following examples are intended to illustrate the invention and are not to be construed as being limitations thereon. Temperatures are given in degrees centigrade.

EXAMPLE 1

To the stirred solution of 10 g 3-methyl-5-methylmercapto-1,2,4-thiadiazole in 200 ml chloroform are added 35.4 g 87 percent m-chloroperbenzoic acid in 400 ml chloroform over a half-hour period at 0°. The mixture is allowed to warm up to room temperature while stirring overnight. It is filtered, the filtrate washed twice with saturated aqueous sodium bicarbonate, dried, filtered and concentrated. The solid formed is recrystallized from ethanol, to yield the 3-methyl-5-methylsulfonyl-3-methyl-1,2,4-thiadiazole of the formula

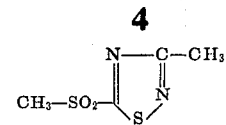

melting at 93°–95°.

The starting material is prepared as follows: 2.3 g sodium is dissolved in 200 ml ethanol and cooled to −10°, whereupon 4.8 g methylmercaptan is added. The mixture is allowed to warm up to room temperature and 13 g 3-methyl-5-chloro-1,2,4-thiadiazole is added in one portion. Yellow solids are formed and the temperature rises to about 40°. The mixture is then refluxed for 1½ hours, allowed to stir overnight and the solids removed by filtration. The filtrate is evaporated in vacuo and the residue distilled in vacuo, to afford the 3-methyl-5-methylmercapto-1,2,4-thiadiazole boiling at 51°/0.35 mmHg.

EXAMPLE 2

To 240 ml of a 0.06 molar solution of monoperphthalic acid in diethyl ether is added the solution of 7.7 g 3-ethyl-5-methylmercapto-1,2,4-thiadiazole in 100 ml diethyl ether over a 5 minute period at −10°. The mixture is allowed to warm up to room temperature while stirring overnight. It is filtered, the filtrate washed twice with saturated aqueous sodium bicarbonate, dried, filtered and concentrated. The residual oil is distilled in vacuo, to afford the 3-ethyl-5-methylsulfonyl-1,2,4-thiadiazole of the formula

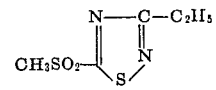

boiling at 110°/0.05 mm Hg.

In an analogous manner to the above, there is also obtained the 3-ethyl-5-ethylsulfonyl-1,2,4-thiadiazole, b.p. 130–136°/0.1 mm Hg.

EXAMPLE 3

To the stirred solution of 7 g 3-n-butyl-5-methylmercapto-1,2,4-thiadiazole in 235 ml chloroform are added 18.2 g 87 percent m-chloroperbenzoic acid in 295 ml chloroform over a half-hour period and maintaining the temperature of the mixture below 0°. The mixture is allowed to warm up to room temperature while stirring overnight and worked up in like manner as in Example 1. Following concentration, the residual oil is fractionally distilled in vacuo and the fraction boiling at 129°–134°/0.06 mm Hg is collected, yielding the 3-n-butyl-5-methylsulfonyl-1,2,4-thiadiazole of the formula

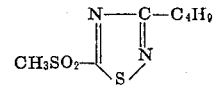

In like manner, treatment of 5 g 3-n-butyl-5-ethylmercapto-1,2,4-thiadiazole with 12.2 g 87 percent m-chloroperbenzoic acid affords the 3-n-butyl-5-ethylsulfonyl-1,2,4-thiadiazole boiling at 152°–156°/0.05 mm Hg.

EXAMPLE 4

To the stirred solution of 3.7 g 3-trichloromethyl-5-methylmercapto-1,2,4-thiadiazole in 100 ml chloroform are added 9.1 g 85 percent m-chloroperbenzoic acid in 100 ml chloroform over a half-hour period at 0°. The mixture is allowed to warm up to room temperature while stirring overnight and worked up in the usual manner. Following concentration, the solid formed is recrystallized from 2-propanol, to give the 3-trichloromethyl-5-methylsulfonyl-1,2,4-thiadiazole of the formula

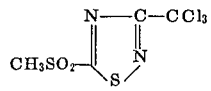

melting at 111°–113°.

Analogously, treatment of 3.45 g 3-trichloromethyl-5-ethylmercapto-1,2,4-thiadiazole with 7.95 g 85 percent m-chloroperbenzoic acids affords on recrystallization from 2-propanol the 3-trichloromethyl-5-ethylsulfonyl-1,2,4-thiadiazole, m.p. 48°–51°.

EXAMPLE 5

Seven g 3-benzyl-5-methylmercapto-1,2,4-thiadiazole is dissolved in 200 ml chloroform and the solution treated with 15.7 g 87 percent m-chloroperbenzoic acid in 340 ml chloroform added over a half-hour period at or below 0°. The mixture is allowed to warm up to room temperature while stirring overnight. Subsequently, it is washed twice with saturated aqueous sodium bicarbonate, once with water and once with saturated aqueous brine. The chloroform solution is dried, filtered and concentrated. The residual solid is recrystallized from ethanol, to yield the 3-benzyl-5-methyl-sulfonyl-1,2,4-thiadiazole of the formula

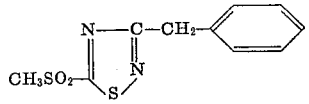

melting at 100°–101°.

EXAMPLE 6

100.0 g of an ointment containing 1 percent of the active ingredient are prepared as follows:

Formula

| | |
|---|---|
| 3-n-butyl-5-ethylsulfonyl-1,2,4-thiadiazole | 1.0 g |
| Liquid petrolatum | 5.0 g |
| White petrolatum | 94.0 g |

Procedure

The thiadiazole is mixed with the liquid petrolatum by using a mortar until an adequate reduction in particle size is accomplished. The white petrolatum is then slowly blended with this mixture; the ointment is passed through a three roller mill, until total uniformity is obtained and filled into epoxy-lined tubes (5.0 g).

EXAMPLE 7

100.0 g of cream, containing 1 percent of the active ingredient is prepared as follows:

Formula

| | |
|---|---|
| 3-n-butyl-5-ethylsulfonyl-1,2,4-thiadiazole | 1.0 g |
| Propylene glycol | 15.0 g |
| Sodium lauryl sulfate | 2.0 g |
| Cetyl alcohol | 15.0 g |
| Phenyl mercuric acetate | 0.002 g |
| Purified water | q.s. |

Procedure

The phenylmercuric acetate is dissolved in 65 ml of water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°.

The thiadiazole is dispersed in the propylene glycol at 45° and added to the above emulsion while agitating. Sufficient water is added to bring the weight to 100 g, and mixing is continued while the product cools to room temperature. The cream is passed through a three roller mill until total uniformity is accomplished and is filled into epoxy-lined tubes (5 g).

We claim:

1. The 1,2,4-thiadiazole of the formula

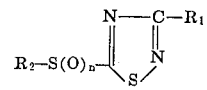

in which $R_1$ is hydrogen, lower alkyl, mono-, di- or tri-halo-lower alkyl or mono-, di- or tri-phenyl-lower alkyl, $R_2$ is lower alkyl and $n$ is the integer 1 or 2.

2. A compound as claimed in claim 1, in which formula $R_1$ is hydrogen, lower alkyl, mono-, di- or tri-halo-lower alkyl or mono-, di- or tri-phenyl-lower alkyl, $R_2$ is lower alkyl and $n$ is 2.

3. A compound as claimed in claim 1, in which formula each of $R_1$ and $R_2$ is lower alkyl.

4. A compound as claimed in claim 1, and being the 3-methyl-5-methylsulfonyl-1,2,4-thiadiazole.

5. A compound as claimed in claim 1, and being the 3-n-butyl-5-methylsulfonyl-1,2,4-thiadiazole.

6. A compound as claimed in claim 1, and being the 3-n-butyl-5-ethylsulfonyl-1,2,4-thiadiazole.

* * * * *

UNITED STATES PATENT OFFICE
CERTIFICATE OF CORRECTION

Patent No. 3,692,794                Dated September 19, 1972

Inventor(s) MELVIN HARRIS ROSEN ET AL

It is certified that error appears in the above-identified patent and that said Letters Patent are hereby corrected as shown below:

Col. 6, formula opposite line 35 should read

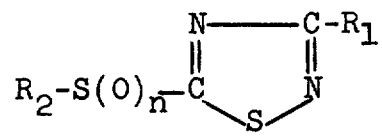

Signed and sealed this 7th day of May 1974.

(SEAL)
Attest:

EDWARD M. FLETCHER, JR.              C. MARSHALL DANN
Attesting Officer                    Commissioner of Patents